US012726413B2

(12) United States Patent
Wei et al.

(10) Patent No.: US 12,726,413 B2
(45) **Date of Patent: *Sep. 1, 2026**

(54) NETWORK ENTITY FOR DETERMINING A MODEL FOR DIGITALLY ANALYZING INPUT DATA

(71) Applicant: HUAWEI TECHNOLOGIES CO., LTD., Shenzhen (CN)

(72) Inventors: Qing Wei, Munich (DE); Clarissa Marquezan, Munich (DE); Yang Xin, Shanghai (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

This patent is subject to a terminal disclaimer.

(21) Appl. No.: 18/809,531

(22) Filed: Aug. 20, 2024

(65) Prior Publication Data

US 2025/0023792 A1 Jan. 16, 2025

Related U.S. Application Data

(63) Continuation of application No. 17/856,740, filed on Jul. 1, 2022, now Pat. No. 12,081,410, which is a (Continued)

(51) Int. Cl.
*G06F 15/173* (2006.01)
*H04L 41/12* (2022.01)
(Continued)

(52) U.S. Cl.
CPC ............ *H04L 41/145* (2013.01); *H04L 41/12* (2013.01); *H04L 41/16* (2013.01)

(58) Field of Classification Search
CPC ........ H04L 41/145; H04L 41/12; H04L 41/16
See application file for complete search history.

(56) References Cited

U.S. PATENT DOCUMENTS 10,157,206 B2 12/2018 Liu et al.
10,198,399 B1 * 2/2019 Fritchman ......... G06F 18/24323
(Continued)

FOREIGN PATENT DOCUMENTS

CN 107766940 A 3/2018
CN 110162606 A 8/2019
(Continued)

OTHER PUBLICATIONS

"3rd Generation Partnership Project; Technical Specification Group Services and System Aspects; Study on Enablers for Network Automation for 5G—phase 2 (Release 17)," 3GPP TR 23.700-91 V0.2.0, pp. 1-19, 3rd Generation Partnership Project, Valbonne, France (Dec. 2019).
(Continued)

*Primary Examiner* — Padma Mundur
(74) *Attorney, Agent, or Firm* — Leydig, Voit & Mayer, Ltd.

(57) ABSTRACT

The disclosure relates to a network entity for determining at least one model parameter of a model for digitally analyzing input data depending on the at least one model parameter of a model, the network entity being configured to receive a model request from a requesting entity over the communication network, the model request requesting the at least one model parameter of the model, to obtain the requested at least one model parameter by at least one of the following: executing a machine-learning model training algorithm, the machine-learning model training algorithm being configured to train the model with input data in order to determine at least one of the requested model parameter; searching a local data base for an existing model; or requesting the at least one model parameter from a further network entity; and to send the requested model parameter towards the requesting entity over the communication network.

20 Claims, 10 Drawing Sheets

Related U.S. Application Data continuation of application No. PCT/EP2020/050109, filed on Jan. 3, 2020.

(51) Int. Cl.
*H04L 41/14* (2022.01)
*H04L 41/16* (2022.01)

(56) References Cited

U.S. PATENT DOCUMENTS

| | | | | |
|---|---|---|---|---|
| 2019/0042955 | A1* | 2/2019 | Cahill | G06N 5/04 |
| 2019/0044831 | A1* | 2/2019 | Guim Bernat | H04L 67/61 |
| 2019/0138908 | A1 | 5/2019 | Bernat et al. | |
| 2019/0372859 | A1 | 12/2019 | Mermoud et al. | |
| 2020/0358670 | A1* | 11/2020 | Lee | H04L 41/5067 |
| 2021/0133562 | A1* | 5/2021 | Hong | G06N 3/04 |
| 2022/0172054 | A1* | 6/2022 | Karapantelakis | G06N 3/048 |
| 2022/0198336 | A1* | 6/2022 | Puente Pestaña | G06N 20/00 |
| 2022/0385735 | A1* | 12/2022 | Yang | H04L 67/568 |
| 2023/0019669 | A1 | 1/2023 | Alabbasi et al. | |

FOREIGN PATENT DOCUMENTS

| | | | |
|---|---|---|---|
| CN | 110569288 | A | 12/2019 |
| WO | 2020169175 | A1 | 8/2020 |
| WO | 2021062740 | A1 | 4/2021 |

OTHER PUBLICATIONS

Yang et al., "Federated Machine Learning: Concept and Applications," ACM Transactions Intelligent Systems and Technology (TIST), vol. 10, No. 2, Article 12, Total 20 pages (Feb. 2019).

"3rd Generation Partnership Project; Technical Specification Group Services and System Aspects; Study of Enablers for Network Automation for 5G (Release 16)," 3GPP TR 23.791 V16.0.0, pp. 1-121, 3rd Generation Partnership Project, Valbonne, France (Dec. 2018).

"3rd Generation Partnership Project; Technical Specification Group Services and System Aspects; Architecture enhancements for 5G System (5GS) to support network data analytics services (Release 16)," 3GPP TS 23.288 V16.2.0, pp. 1-57, 3rd Generation Partnership Project, Valbonne, France (Dec. 2019).

"3rd Generation Partnership Project; Technical Specification Group Services and System Aspects; System Architecture for the 5G System; Stage 2 (Release 15)," 3GPP TS 23.501 V15.3.0, pp. 1-226, 3rd Generation Partnership Project, Valbonne, France (Sep. 2018).

"3rd Generation Partnership Project; Technical Specification Group Services and System Aspects; System architecture for the 5G System (5GS); Stage 2 (Release 16)," 3GPP TS 23.501 V16.3.0, pp. 1-417, 3rd Generation Partnership Project, Valbonne, France (Dec. 2019).

"3rd Generation Partnership Project; Technical Specification Group Services and System Aspects; Procedures for the 5G System (5GS); Stage 2 (Release 16)," 3GPP TS 23.502 V16.3.0, pp. 1-558, 3rd Generation Partnership Project, Valbonne, France (Dec. 2019).

"Discussion about 3GPP Rel-17 eNA phase 2," SA WG2 Meeting #132, Xi'an, China, S2-1903098, pp. 1-11, 3rd Generation Partnership Project, Valbonne, France (Apr. 8-15, 2019).

"Proposed New SID on Enablers for Network Automation for 5G—Phase 2," 3GPP TSG-SA WG2 Meeting #133, Reno, USA, S2-1906722 (Revision of S2-1906055/5157/3996/3961/3876/3097), Total 4 pages, 3rd Generation Partnership Project, Valbonne, France (May 13-17, 2019).

* cited by examiner

NETWORK ENTITY FOR DETERMINING A MODEL FOR DIGITALLY ANALYZING INPUT DATA

CROSS-REFERENCE TO RELATED APPLICATIONS

This application is a continuation of U.S. patent application Ser. No. 17/856,740, filed on Jul. 1, 2022, which is a continuation of International Application No. PCT/EP2020/050109, filed on Jan. 3, 2020. All of the aforementioned patent applications are hereby incorporated by reference in their entireties.

FIELD

The standard 3GPP SA2 introduces in Rel. 16 a Network Data Analytics Function (NWDAF) which shall be able to provide analytics services for network data which can be consumed by 5G core network function (NF), or an external entity such as an Application Function (AF).

BACKGROUND

In Rel. 16 of the standard 3GPP SA2, the NWDAF is considered as one logical entity which integrates the following functionalities according to TS 23.501:

Support data collection from NFs and AFs;

Support data collection from operations administration and maintenance (OAM);

NWDAF service registration and metadata exposure to NFs/AFs;

Support analytics information provisioning to NFs, AF.

The NWDAF usually executes data processing algorithms in order to analyze input data provided to the NWDAF. The data processing algorithms can be machine-learning (ML) algorithms implementing artificial intelligence (AI) models, also referred to as machine-learning models or models, being defined by model type and model parameters, which should be trained before deployment.

However, the cost of deploying AI models and training services, including hardware and software cost, as well as the development of numerous AI models and continuously updated R&D costs, are rather high.

Therefore, the inventors have recognized that there is a need for a more efficient training of models which can be used by machine-learning, in particular AI, algorithms for processing data.

SUMMARY

An aspect of the present disclosure provides more efficient training of models, which can be used by machine-learning (ML), in particular AI, algorithms for processing data.

Aspects of the present disclosure are based on the finding that the forgoing defined need and other problems can be solved by separating a model training platform using, e.g., machine-learning algorithms for training a model, e.g. a machine learning model, and an inference platform. The separation can be, e.g., implemented in technologies such as federate machine learning, which support joint training of data sets from different parties without disclosure of the detailed data sets between different parties or to the federate server or collaborator. This enables the sharing of the platform between different owners of the data set.

According to the present disclosure, a method and apparatus for an NWDAF (Network Data Analytics Function) is provided with limited data training capability, or fast analytics generation requirements to obtain an external model, e.g. a machine-learning model. Thereby, the following problems can efficiently be solved:

1. Which network function is able to provide such a model in a 5G system?
2. How the consumer NWDAF can discover a needed model in a 5G system?
3. How can that model be provided to the consumer NWDAF?

According to the present disclosure, provisioning of parameters of a model to be used by a NWDAF in 5GS and the model registration, discovery and provision services based on 5GS SBA (Service-based Architecture) can be provided.

This can enable, e.g., a PLMN NWDAF to share the model training capability of another PLMN (Public Land Mobile Network) NF (Network Function) instance, and/or another PLMN or 3rd party without exposing the data of certain area or its own network. It allows for more flexible NWDAF functionality deployment with separated Model training platform. In consequence, operator CAPEX/OPEX (Capital expenditure/Operational expenditure) can be reduced. Moreover, the raw data does not need to be exposed in order to obtain the ML Model.

In addition, using an existing model can help the NWDAF to speed up the data analytics generation and increase the accuracy of data analytics generation. Moreover, the NWDAF does not need to train a model by itself or to train a model from the beginning on. The needed time for model training and related data collection can therefore be greatly reduced. Moreover, an existing model could be trained using the data with broader coverage and/or longer data collection period, e.g. comparing to the training data collected by the NWDAF after data analytics generation request has been received. This can increase the accuracy of the analytics generation of the NWDAF considering using a better trained model.

Accordingly, the present disclosure relates to a method and an apparatus which provides a model for generating data analytics (e.g., at NWDAF) in 5GS. According to some embodiments, this may include:

- Register its model provision capability in the 5GS (i.e., registers the model provision service at NRF, so that the consumer NF is able to discover the model provision capability provided by this network entity by inquiring the NRF (NF Repository Function).
  - Definition of model provision service and related parameters to be registered in the NRF, such as a list comprising model type, analytics ID, feature sets, event IDs, etc.)
  - Related procedure and signaling for the registration and discovery of the model provision service, e.g., in case this NE is in the same PLMN or different PLMN than the consumer NF, or from the 3rd party.
- Process the incoming request on a model from a consumer NF in 5GS, obtain information needed to generate the response for the requested model and provide the response for a model to the consumer NFs in 5GS.
  - Request for a model including the description of the model, e.g. indicated by model type, analytics ID, feature sets, event IDs, etc., and requested model parameters, e.g., weights of the features.
  - Response for a model which includes side information such as formular or abstraction which describes the relationship between the output and input, e.g., weight of each feature, and/or requested model parameters.

Related procedure and signaling for the model request and response, e.g., subscription to a model provision service.

A model in this disclosure refers, according to some examples, to a machine-learning model, e.g. an AI model, or an equation that can be used to generate data analytics based on a set of input data.

According to a first aspect, the disclosure refers to a network entity for determining at least one model parameter of a model for digitally analyzing input data depending on the at least one model parameter of a model, the network entity being configured to receive a model request from a requesting entity over the communication network, the model request requesting the at least one model parameter of the model, to obtain the requested at least one model parameter by at least one of the following: executing a machine-learning model training algorithm, the machine-learning model training algorithm being configured to train the model with input data in order to determine at least one of the requested model parameter; searching a local data base for an existing model; or requesting the at least one model parameter from a further network entity; and to send the requested model parameter or the model towards the requesting entity over the communication network. In an alternative example, the network entity is configured to determine a model with the model parameter, and to send the model to the requesting entity.

The network entity can be any entity in a communication network, such as NWDAF, AF, NF, NEF, NRF, UE or any other entity, in particular any 5G network entity.

The model can be a machine-learning model that is at least partly represented by model parameters, such as weights. A machine-learning algorithm such as an AI algorithm may deploy the model with the model parameters when executed by a processor of an entity for processing input signals.

The model training is performed in order to determine at least one model parameter. The model training can be performed using training data which differs from the input data that shall be processed upon the basis of the trained model. The model training is performed by a machine-learning model training algorithm that can be provided as a ML platform, in particular AI platform. The model training is performed by a machine-learning model training algorithm can be a representation of a machine-learning model algorithm used by the requesting entity e.g. for analyzing input data.

In an example, the communication network comprises a registering entity, the registering entity being configured to register models, wherein the network entity is configured to send a registration signal to the registering entity over the communication network, the registration signal comprising information on the model in order to register the model with the registering entity.

The registering entity can be any entity in a communication network, such as NWDAF, AF, NF, NEF, NRF, UE or any other entity, in particular any 5G network entity.

In an example, the registration information comprises at least information on a model type, a data analytics identification, a set of features or input data type (e.g. event IDs) of the model, or at least one model parameter of the model. For example the registration information may include a model output in particular a data analytics identifier, model input in particular a set of features or event IDs of the model or at least one model parameter of the model.

In an example, the network entity is configured to send and/or receive information on the model with the model request, which includes at least one of the following: model type, machine-leaning training algorithm, Analytics ID, feature sets, input data type particular event ID, area of interest, application ID, information on the model, in particular from the requesting network entity, model ID, in particular model version, a model time, in particular a time stamp.

In an example, the model request comprises information on the model for determining the at least one requested model parameter, wherein the network entity is configured to provide and/or execute the machine-learning model training algorithm upon the basis of the received information on the model from a set of machine-learning model training algorithms available at the network entity.

In an example, the network entity is configured to receive a further model request from a further requesting network entity, the further parameter request requesting a further model parameter of a further mode, or to determine a further network entity, in particular via a registering entity, which is capable of providing a further model; and to send a request for the further model towards the further network entity over the communication network; and to receive the further model from the further network entity.

In an example, the network entity is configured to send information on the model to the further network entity.

In an example, the network entity is configured to send the request for the further model parameter towards the further network entity if the network entity has determined that the further model or at least one of the further model parameter cannot be provided or trained by the network entity.

For example, this can be determined if the further model is not supported by the machine-learning model training algorithm at the network entity; if some of the further model parameter is not available at the network entity; and/or if the network entity is not able to provide the further model or further model parameters on time.

In an example, the network entity is configured to request information on the further network entity from a registering entity in order to discover the further network entity.

According to a second aspect, the disclosure relates to a registering entity in a communication network for providing information on available models in the communication network, the registering entity being configured to receive a registration signal from a network entity, the registration signal indicating a model that can be provided by the network entity, and to store information on the model and/or a communication network identifier and/or address of the network entity.

The registering entity can be any entity in a communication network, such as NWDAF, AF, NF, NEF, NRF, UE or any other entity, in particular any 5G network entity.

In an example, the registering entity is configured to receive a discovery request from a requesting network entity, the discovery request indicating a model and/or a model parameter to be obtained, to determine a network entity for proving and/or training the model, and to send a network identifier and/or address of the determined network entity to the requesting network entity.

According to a third aspect, the disclosure relates to a requesting entity being configured to implement a machine-learning data analyzing algorithm for analyzing input data upon the basis of a model, the model being represented by model type and model parameters, wherein the requesting entity is configured to send a discovery request towards a registering entity over a communication network, the discovery request indicating a model and/or a model parameter to be obtained,; receive the network identifier and/or address of a network entity from the registering entity; send a model request towards the network entity; receive the requested model and/or a model parameter from the network entity; and execute the machine-learning analyzing algorithm with the received model for analyzing the input data.

According to a fourth aspect, the disclosure relates to a method for determining at least one model parameter of a model for digitally analyzing input data depending on the at least one model parameter of a model, the method comprising receiving a model request from a requesting entity over the communication network, the model request requesting the at least one model parameter of the model; obtaining the requested at least one model parameter by at least one of the following: executing a machine-learning model training algorithm, the machine-learning model training algorithm being configured to train the model with input data in order to determine at least one of the requested model parameter; searching a local data base for an existing model; or requesting the at least one model parameter from a further network entity; and sending the requested model parameter towards the requesting entity over the communication network.

In an example, the communication network comprises a registering entity, the registering entity being configured to register machine-learning algorithms implementing machine-learning models, the method comprising: sending a registration signal to the registering entity over the communication network, the registration signal comprising information on the model, in particular a data analytics identification, a set of features or input data type of the model, or at least one model parameter of the model in order to register the model with the registering entity.

In an example, the method can be executed by the network entity according to the first aspect.

According to a fifth aspect, the disclosure relates to a computer program comprising a computer program code for performing the method according to the fourth aspect, when the computer program is executed by a processing entity, in particular the network entity according to the first aspect.

BRIEF DESCRIPTION OF THE DRAWINGS

The present disclosure will be described in even greater detail below based on the exemplary figures. The present disclosure is not limited to the exemplary embodiments. All features described and/or illustrated herein can be used alone or combined in different combinations in embodiments of the disclosure. The features and advantages of various embodiments of the present disclosure will become apparent by reading the following detailed description with reference to the attached drawings which illustrate the following.

DETAILED DESCRIPTION

In the following, identical reference signs refer to identical or at least functionally equivalent features.

In the following description, reference is made to the accompanying figures, which form part of the disclosure, and which show, by way of illustration, exemplary aspects of embodiments of the present disclosure or exemplary aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
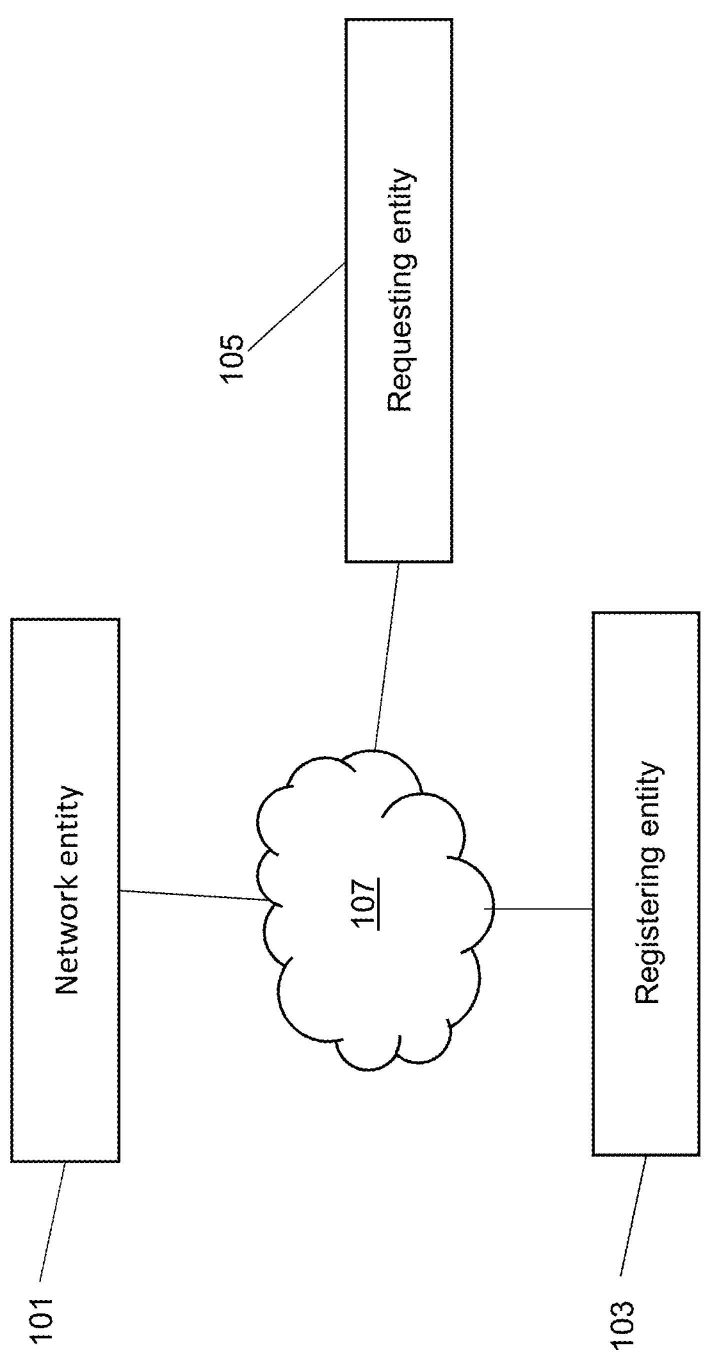
FIG. 1 shows schematically a communication scenario in an implementation example.

FIG. 1 shows schematically a communication scenario in an example with a network entity 101, a registering entity 103 and a requesting entity 105 being arranged to communicate over a communication network 107, e.g. a 5G communication network.

The network entity 101 is configured for determining at least one model parameter of a model with model parameters which can be used by a machine-learning data analysis algorithm digitally analyze input data depending on the at least one model parameter of the model. The model can be a machine-learning (ML), in particular an AI, model.

The network entity 101 is configured to receive a model request from the requesting entity 103 over the communication network 107. The model request requests at least one model parameter of the model. In this way, the requesting entity 103 can omit training its machine-learning model or only train a partial machine-learning model in order to obtain model parameters suitable for analyzing input data to obtain e.g. a network analytic information.

The network entity 101 is configured to obtain the requested at least one model parameter by at least one of the following: executing a machine-learning model training algorithm, the machine-learning model training algorithm being configured to train the model with input data in order to determine at least one of the requested model parameter, searching a local data base such as a storage for an existing ML model, or requesting the at least one model parameter from a further network entity, and to send the requested at least one model parameter towards the requesting network entity over the communication network. The network entity may generate or determine a model based on the requested at least one parameter and send to the requesting entity the determined model instead of the model parameters.

The further network entity can have the features of the network entity 101. The further network entity can be arranged in a further communication network that may be another 5G communication network of a different network operator. The further network entity can be arranged in the communication network 107 as well.

The registering entity 103 is for providing information on available models for e.g. machine-learning algorithms in the communication network 107.

The registering entity 103 is configured to receive a registration signal from the network entity 101, the registration signal indicating a model that can be provided by the network entity 101, and to store information on the model and/or a communication network identifier, e.g. identifying a 5G communication network 107 or a subnetwork thereof, such as a 5G slice, and/or network address of the network entity 101.

In an example, the registering entity 103 can be configured to receive a discovery request from the requesting entity 105, the discovery request indicating a model and/or a model parameter to be trained, to determine the network entity 101 for proving and/or training the model, and to send a network identifier and/or address of the determined network entity 101 to the requesting network entity 105.

The requesting entity 105 is configured to implement a machine-learning data analyzing algorithm for analyzing input data upon the basis of the model to be trained. The requesting network entity 105 is configured to send a discovery request, comprising indication of a model such as model type, model input/output towards the registering entity 103 over the communication network, receive the network identifier and/or address of a network entity from the registering entity, send a request for the model, e.g. together with a model parameter towards the network entity, receive the requested model from the network entity, and execute the machine-learning data analysis algorithm with the received model for analyzing the input data.

Figure 2:
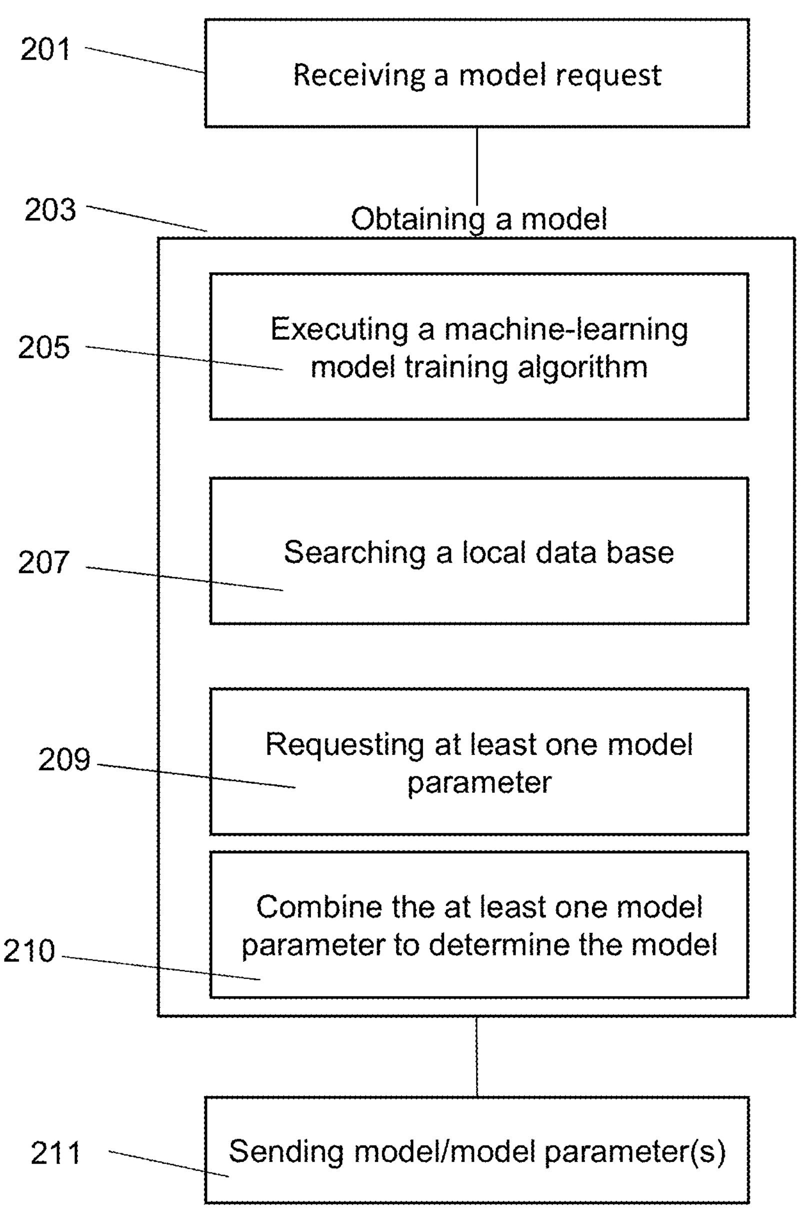
FIG. 2 shows a schematic diagram of a method for determining at least one model parameter of a machine-learning data analysis algorithm in a communication network.

FIG. 2 shows a schematic diagram of a method for determining at least one model parameter of a machine-learning data analysis algorithm in a communication network, the machine-learning data analysis algorithm being configured to digitally analyze input data depending on the at least one model parameter of a machine-learning model.

The method can be executed by the network entity 101 according to the scenario as shown in FIG. 1. The method comprises receiving 201 a model request e.g., from the requesting entity 105 over the communication network 107, the model request requesting the at least one model and/or model parameter, obtaining 203 the requested at least one model and/or model parameter by at least one of the following: executing 205 a machine-learning model training algorithm, the machine-learning model training algorithm being configured to train the model with input data in order to determine at least one of the requested model parameter, or searching 207 a local data base of the network entity 101 or of the communication network 107, e.g. a data storage, for an existing model, or requesting 209 at least one model parameter and/or model from a further network entity. The network entity 101 may generate or determine 210 a model based on the requested at least one model parameter. The requested model parameter and/or model is sent 211 towards the requesting entity 105 over the communication network.

Figure 3:
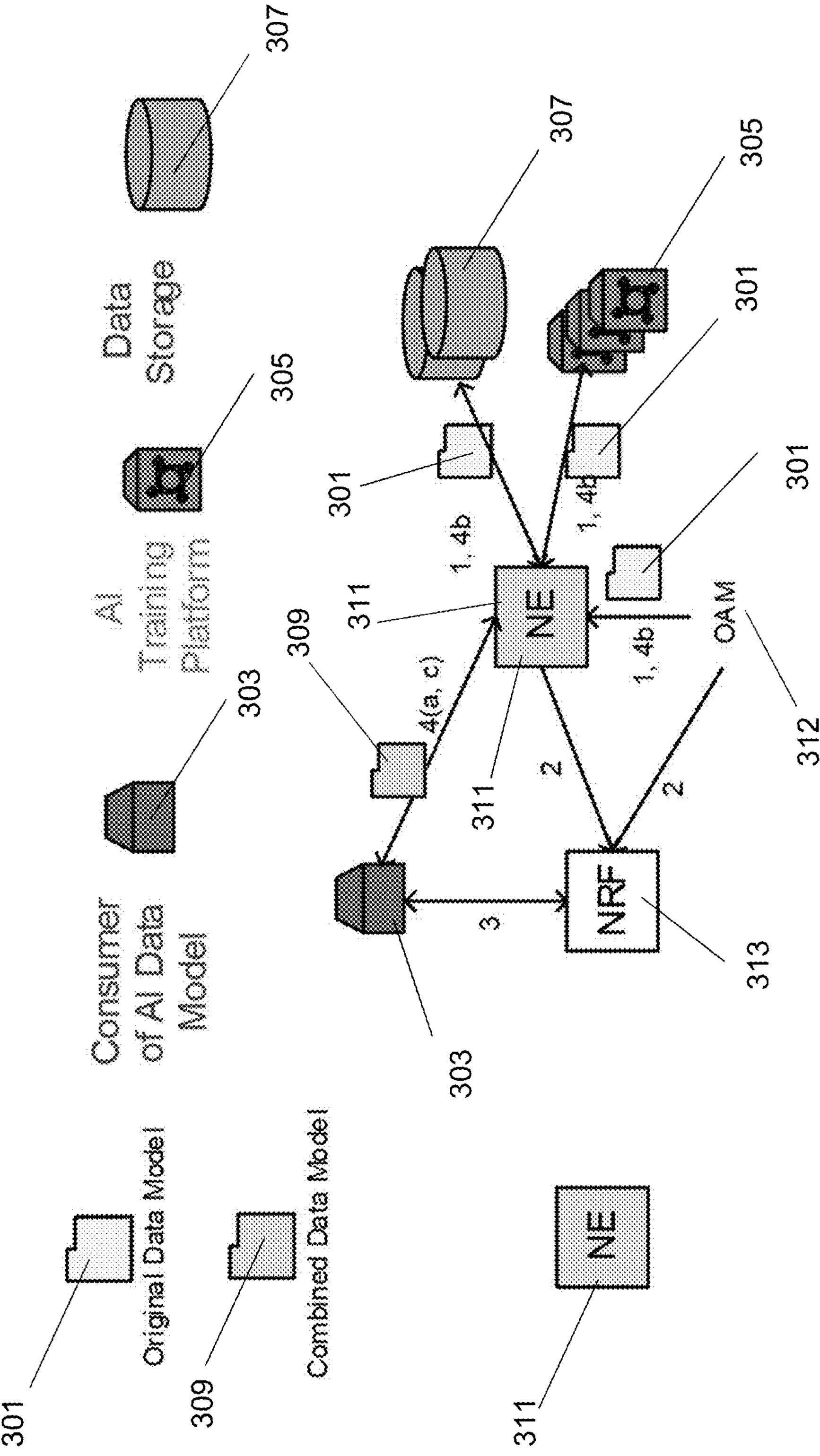
FIG. 3 shows schematically an overview of a system according to an example.

FIG. 3 show schematically communication scenarios according to this disclosure in an example, with a model 309, e.g. a data model, a consumer 303 of the data model 309 such as the requesting entity 105, and optional further data model(s) 301, data storage 307 forming an example of a local or external data base, and a local or external model training platform 305, which may be an AI training platform, in particular a machine-learning model training algorithm. The model 309 also referred to as "combined data model" may be generated by the network entity 311 by combining the parameters of the further model(s) 301 (also indicated in the figure as "original data model").

The procedure in an embodiment may have the following phases.

In the model provision preparation phase 1, a network entity 311, forming an embodiment of the network entity 101, implements as provider the local model training platform 305 or a local data storage 307, and checks its model provision capability directly from itself, or with the assistance of other network entities, implements as provider the external model training platform 305 or an external data storage 307, e.g., via subscription to other network entities services, or by a combination thereof.

In the model registration phase 2, the network entity 311 registers the model(s) to a PLMN NRF 313, forming an embodiment of the registering entity 103, either directly or via a NEF. Alternatively, an OAM 312 can directly write Network Entity registration information in the NRF 313.

In the model discovery phase 3, a consumer NE 303 such as NWDAF or model inference platform, both forming examples of the requesting entity 105, discovers the NE 311 which is able to provide the model e.g. via NRF discovery service with a discovery request providing a communication address of the NE 311.

In the model consumption phase 4, in step 4*a*, the consumer NE 303 requests the model and/or model parameters from the provider NE 311 directly or via a NEF.

In step 4*b*, the provider NE 311 may obtain the requested model parameters, e.g. from itself, from an OAM configuration, from other network entities, from the data storage 307, or from any combination of the described distribution approaches, e.g. via processing. In step 4*c*, the provider NE 311 responses with the requested model parameters or a "combined data model".

Figure 4:
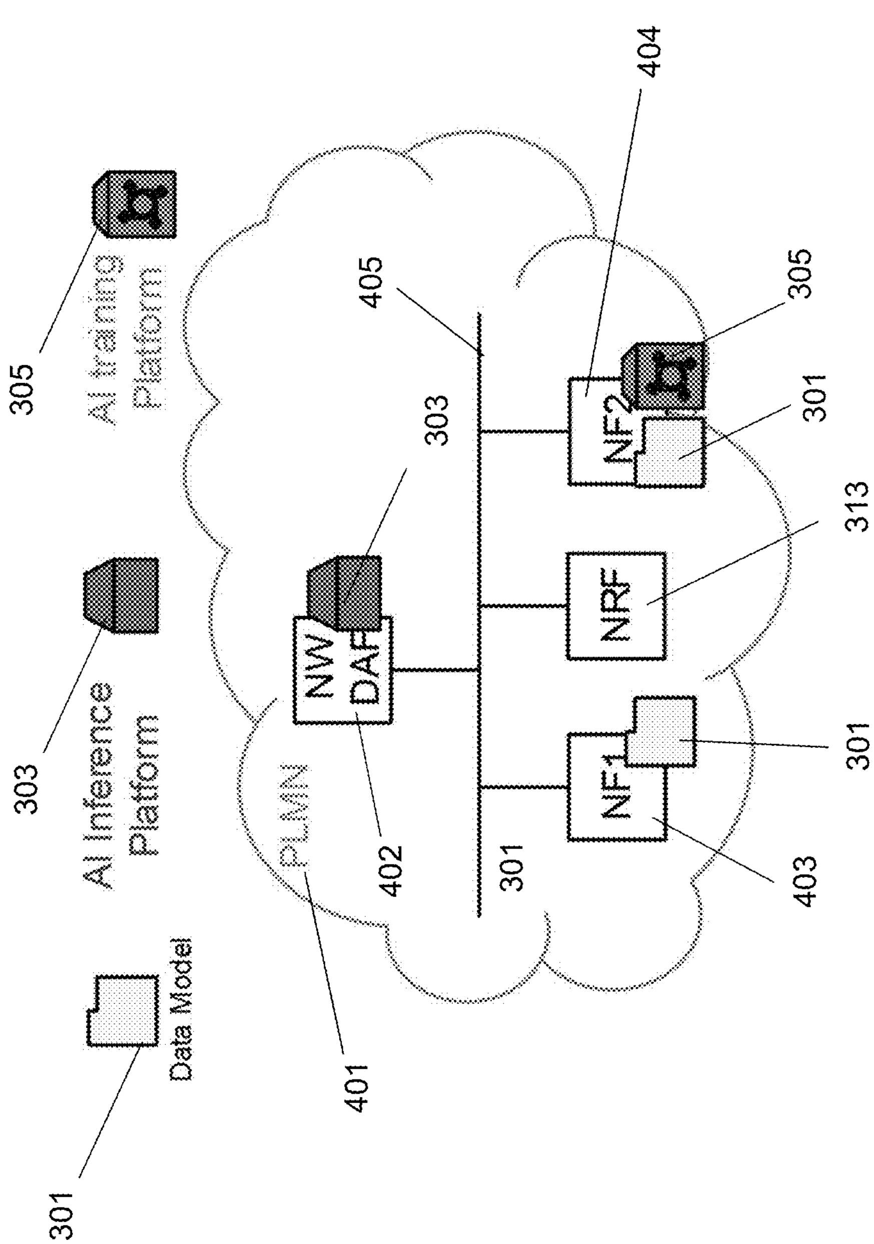
FIG. 4 shows a communication scenario according to an example.

As shown in FIG. 4, providing, i.e. provisioning, the model training platform 305 can be arranged in a PLMN 401, forming an embodiment of a communication network, in which further NFs such NF1 403, NF2 404 connected to the NWDAF 402 via a communication link 405 are present. The NWDAF 402 can implement the requesting entity 105, e.g. as inference platform 303.

According to the example shown in FIG. 4, the NF1 403 or the NF2 404, both forming examples of the network entity 101, can implement the model training platform and provide the model provision service. These entities are arranged in the PLMN 401 forming an embodiment of the communication network, implementing the 5GC (5G core).

Figure 5:
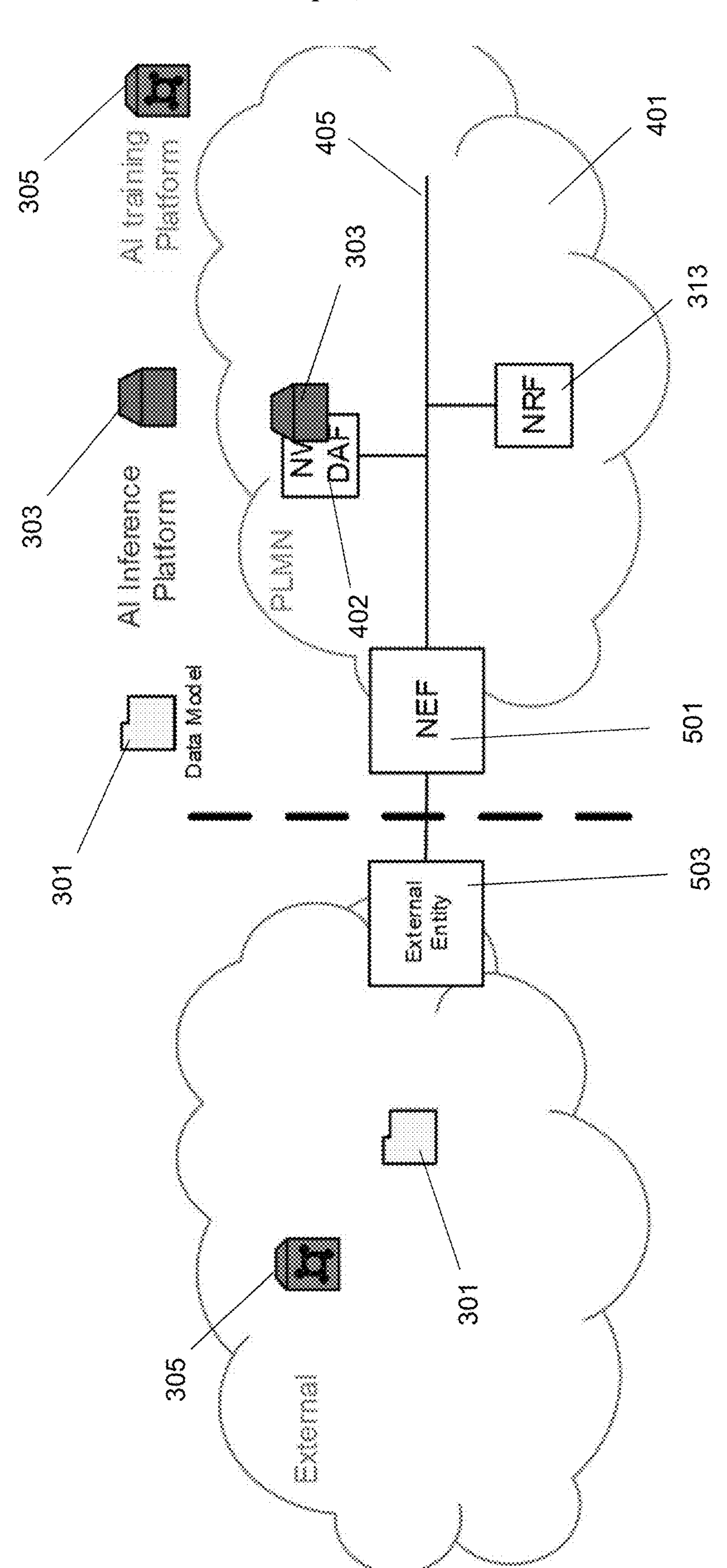
FIG. 5 shows a communication scenario according to a further example.

According to the example shown in FIG. 5, the model provision service can be provided by an external NE 503 such as AF, NWDAF or UDR, forming embodiments of the network entity 101 that implements the model training platform 305 outside of the PLMN 401. The external NE 503 can communicate with the PLMN 401 via e.g. a NEF 501.

In an example, the model provision service can be defined for the provider NE forming an example of the network entity 101, implementing the model training platform 305.

As to the model provision service, the provider NE 503 implementing the model training platform 305 can be federate server, a data storage in a PLMN or a trusted AF or untrusted AF, forming examples of the network entity 101.

The consumer network entity can be formed by a model inference platform, such as NWDAF, which may form an example of the requesting entity 105.

For requesting a model and/or training a model, the following input information can be provided: model type, feature sets, event IDs, analytics ID. Optionally, tracking Area ID (TAI)—which indicate area of interest or NE serving area, UE types, application ID, Network Slice Selection Assistance Information (NSSAI), additional model information, e.g., accuracy level of the model, model time, model ID, model version, etc. Optionally, requested model parameters, e.g. unknown weights, can be indicated.

As output of the model training or response to the model request, one or more model parameters, e.g. weights, or a combined model can be provided.

The model type can be formed by one or more of the following: linear regression; Logistic regression, linear discriminant analysis, decision trees, naive Bayes, K-Nearest Neighbors, learning vector quantization, support vector machines, bagging and random forest, deep neural networks, etc.

In the following example, a model in case of linear regression is described as follows:

$$h(x) = w_0x_0 + w_1x_1 + w_2x_2 + w_3x_3 + w_4x_4 + w_5x_5 \ldots + w_Dx_D$$

Generated analytics indicated by analytics ID: h(x)

Feature sets: $x_0, x_1, x_2 \ldots x_D$

Weights: $w_0, w_1, w_2, \ldots w_D$

The features can be derived from the data indicated by event ID or OAM measurement types.

An Event ID identifies the type of event being subscribed to. This is specified in 3GPP TS23.502.

In an example, the event IDs as specified in TS23.502 can be PDU Session release, UE mobility out of an Area of Interest, etc.

In an example, the analytics IDs as specified in TS23.288 can be: Service Experience (Clause 6.4), NF load information (Clause 6.5), Network performance (Clause 6.6), UE mobility (Clause 6.7.2), UE communication etc.

For the registration of the model provision service, the following parameters can be provided:

Model type, feature sets/Event IDs, analytics ID,

Optionally, TAI(s), UE types, application ID, NSSAI,

Optionally, additional model information such as model ID, model time or model version.

In some examples, the model is provided by the model training platform 305, a model storage, or a federate server.

The model training platform 305 can be implemented and/or distributable as a software code that implements a machine-learning model training algorithm.

In an example, a model can be directly provided by a model training platform located at different 5GC NFs, e.g., a NWDAF, a trusted/untrusted AF. An example of service enhancement of each NF/NEs for different cases is described in the following.

In some examples, the model can be provided by the NWDAF as summarized in the following table:

TABLE I

| Service Name | Service Operations | Operation Semantics | Example Consumer(s) |
|---|---|---|---|
| Nnwdaf_AnalyticsSubscription | Subscribe | Subscribe/ Notify | PCF, NSSF, AMF, SMF, NEF, AF |
| | Unsubscribe | | PCF, NSSF, AMF, SMF, NEF, AF |
| | Notify | | PCF, NSSF, AMF, SMF, NEF, AF |
| Nnwdaf_AnalyticsInfo | Request | Request/ Response | PCF, NSSF, AMF, SMF, NEF, AF |
| Nnwdaf_DataModelProvision | Subscribe Unsubscribe Notify | Subscribe/ Notify | NWDAF |
| Nnwdaf_DataModelInfo | Request | Request/ Response | NWDAF |

The NF services can be provided by NWDAF AS DESCRIBED IN TS23.288.

In some examples, a model can be provided by AF and/or 3rd party AF, as summarized in the following table:

TABLE II

| Service Name | Description | Reference in TS 23.502 [3] |
|---|---|---|
| Naf_EventExposure | This service enables consumer NF(s) to subscribe or get notified of the event as described in TS 23.288 [86]. | 5.2.19.2 |
| Naf_DataModelProvision | This service provides a model for NWDAF(s) | |

The NF services provided by the AF can be implemented as described in the TS23.501.

In case the model is provided by a 3rd party AF, a NEF exposure capability can be enhanced to bridge the Data Model Provision service of 3rd party AF to 5GC NF, as summarized in the following table:

TABLE III

| Service Name | Description | Reference in TS 23.502 [3] |
|---|---|---|
| Nnef_EventExposure | Provides support for event exposure | 5.2.6.2 |
| Nnef_AnalyticsExposure | Provides support for exposure of network analytics | 5.2.6.16 |
| Nnef_DataModelExposure | Provides support for exposure of model | |

The NF Services can be provided by the NEF as described in the TS23.501.

Figure 6:
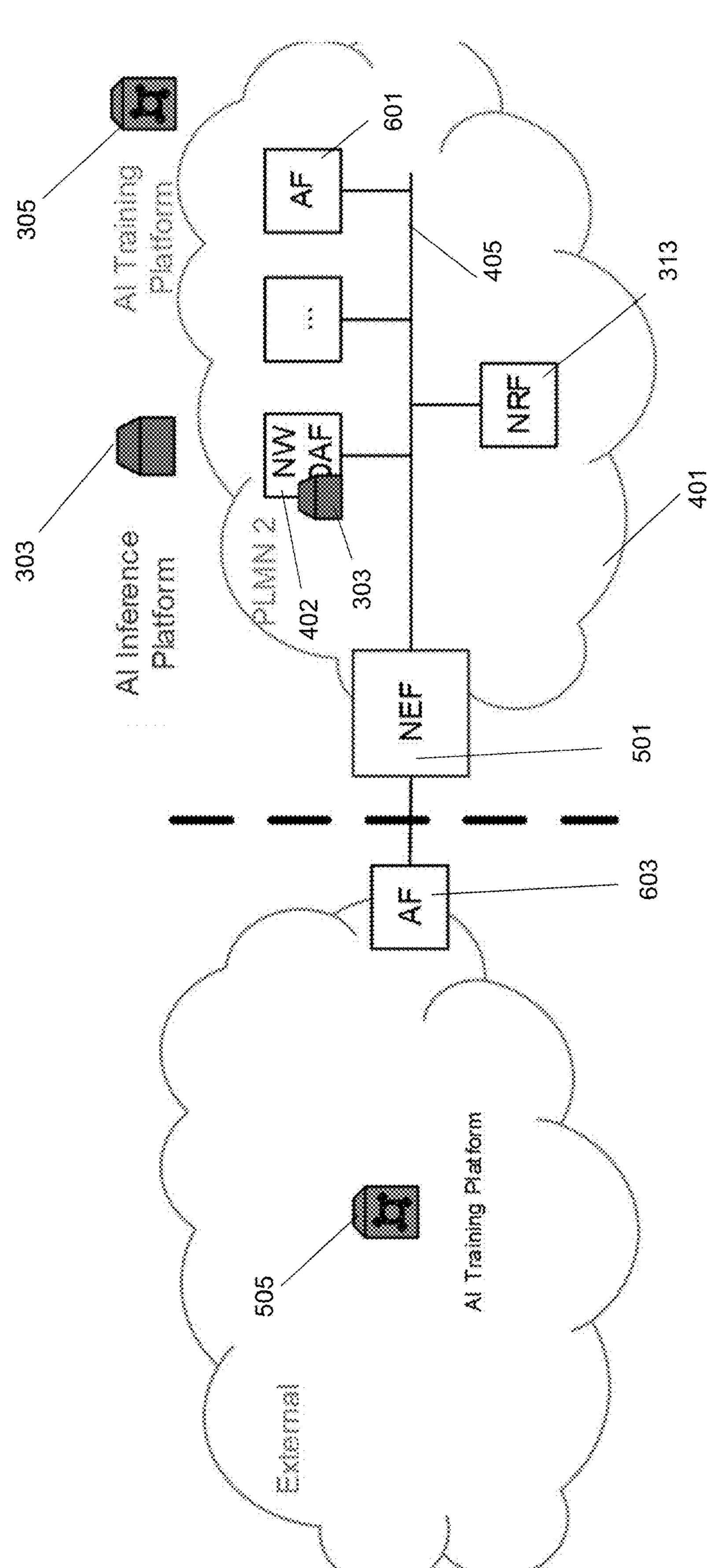
FIG. 6 shows a communication scenario according to a further example.
Figure 7:
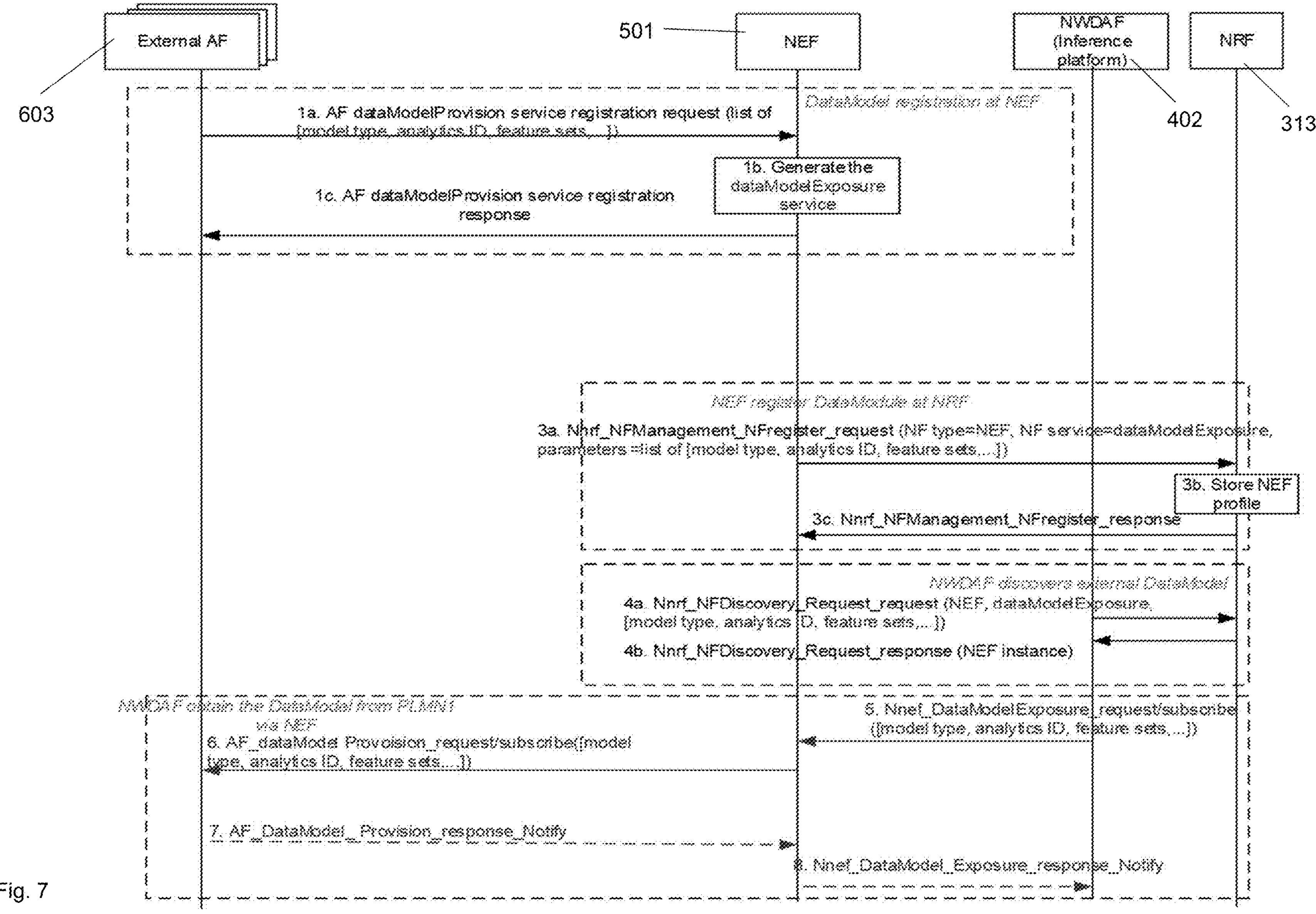
FIG. 7 shows an example of a message sequence chart applicable for example to the communication scenario of FIG. 6.

As depicted in FIG. 6, a model can be provided by an external/3$^{rd}$ party application/NF/NE considering one PLMN domain via AF (Application Function). An external/3$^{rd}$ party/untrusted AF 603 is used in case the provider NF/NE is untrusted for the PLMN. An internal/trusted AF 601 is used in case the provider NF/NE is trusted for the PLMN. In case the external AF 603 provides the model, forming another example of network entity 101, reverse NEF exposure capability of the PLMN NEF 501 can be used to obtain the model from the external AF 603. Then the procedure as depicted in FIG. 7 may be applied, according to which the NWDAF discovers and obtains the model provided by external AF 603. Optionally, an internal AF 601 may be present.

With reference to FIG. 7, in step 1*a*, the external AF 603 sends model registration request to the NEF 501 forming an embodiment of the registration entity 103, e.g., using previous IPR on AF service registration. The registration request includes the Naf_DataModelProvision service profile in the AF Profile, which further includes the service parameter list with e.g. model type, analytics ID, feature sets/event IDs, etc.

In step 1*b*, the NEF 501 generates a data model exposure service to expose the supported model info including service parameters list with e.g. model type, analytics ID, feature sets/event IDs, etc.

In step 1*c*, the NEF 501 responses to the registration request with a model ID for each item in the list.

In step 3, the NEF 501 registers its data model exposure service at the NRF with the list with e.g. model type, analytics ID, feature sets/event IDs, etc.

In step 4, the NWDAF 402 discovers the NEF 501 which provides the required model via NRF.

In step 5, the NWDAF 402 subscribes to the data model exposure service provided by the NEF 501 including the parameters of model type, analytics ID, feature sets/event IDs, requested model parameters, etc.

In step 6, the NEF 501 subscribes to the data model provision service provided by external AF including the parameters of model type, analytics ID, feature sets/event IDs, requested Model parameters, etc.

In step 7, external AF 603 provides the requested model and/or model parameters to NEF 501 via response or notification message.

In step 8, NEF 501 provides the requested model and/or model parameters to NWDAF 402 via response or notification message.

Figure 8:
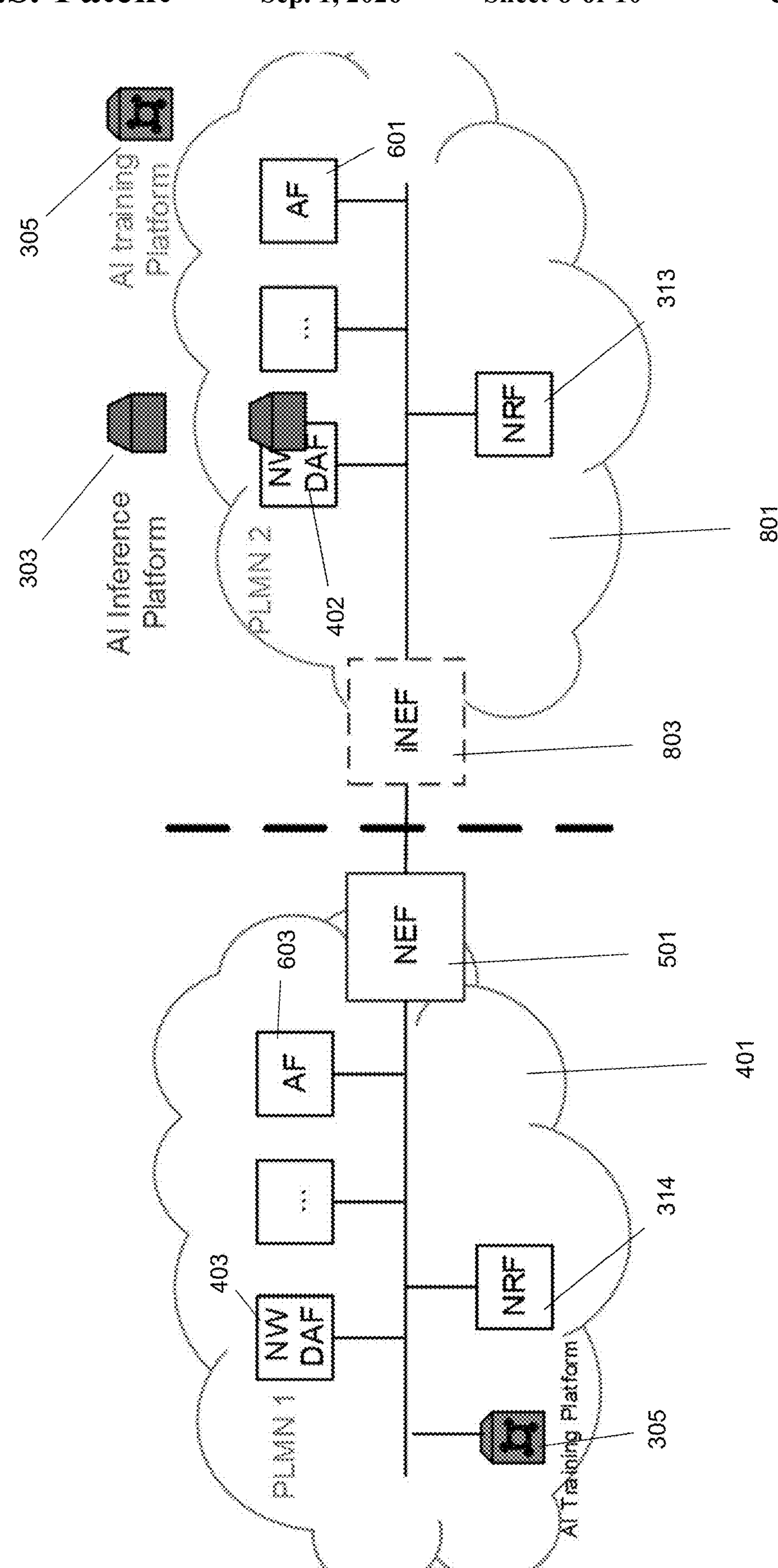
FIG. 8 shows a communication scenario according to a further example.

With reference to FIG. 8, a model can also be provided by application/NF/NE, e.g., a federate server or model training platform implemented as AF 603, in other PLMN (indicated as PLMN 1 401). In this case, the NEF 501 and an iNEF 803 in roaming architecture can be used for the signaling exchange between the AF 603 and 5GC NFs of a different PLMN 2, e.g. PLMN 801. The model can be provided by another operator's CP NF, e.g. the AF 603.

Figure 9:
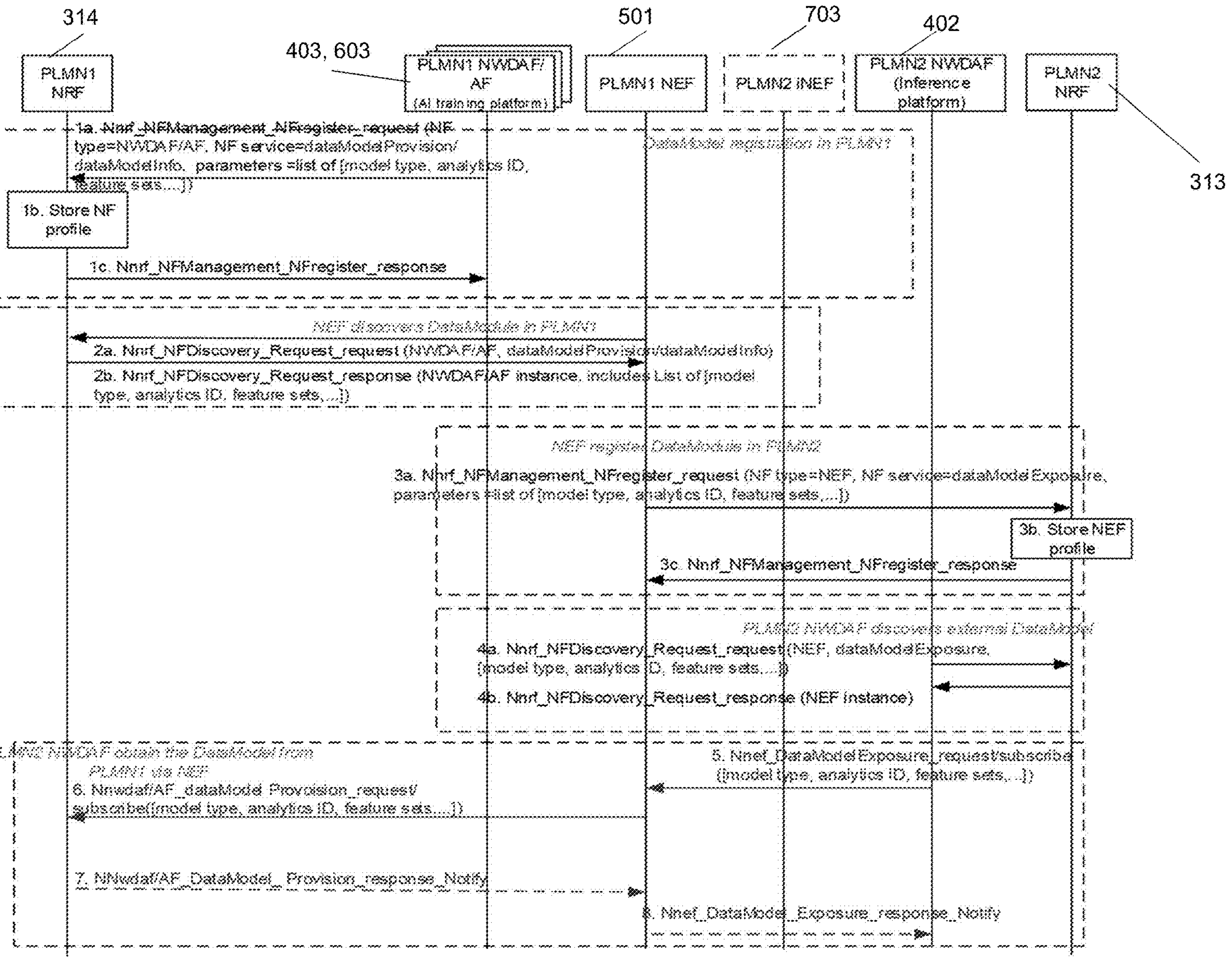
FIG. 9 shows an example of a message sequence chart applicable for example to the communication scenario of FIG. 8.

With reference to FIG. 8, the procedure shown in FIG. 9 can be applied, where the PLMN2 801 NWDAF 402 can discover and obtain the model provided by the PLMN1 401.

Step 1 comprises PLMN1 model registration at NRF 313. In Step 2, the PLMN1 NEF 501 discovers the model. In step 3, the PLMN1 NEF 501 registers model at PLMN2 NRF 313. In Step 4, the PLMN2 NWDAF 402 discovers model via PLMN2 NRF 314. In steps 5 to 8, the PLMN2 NWDAF 402 consumes the model provided by PLMN1 401 via NEF 501.

Figure 10:
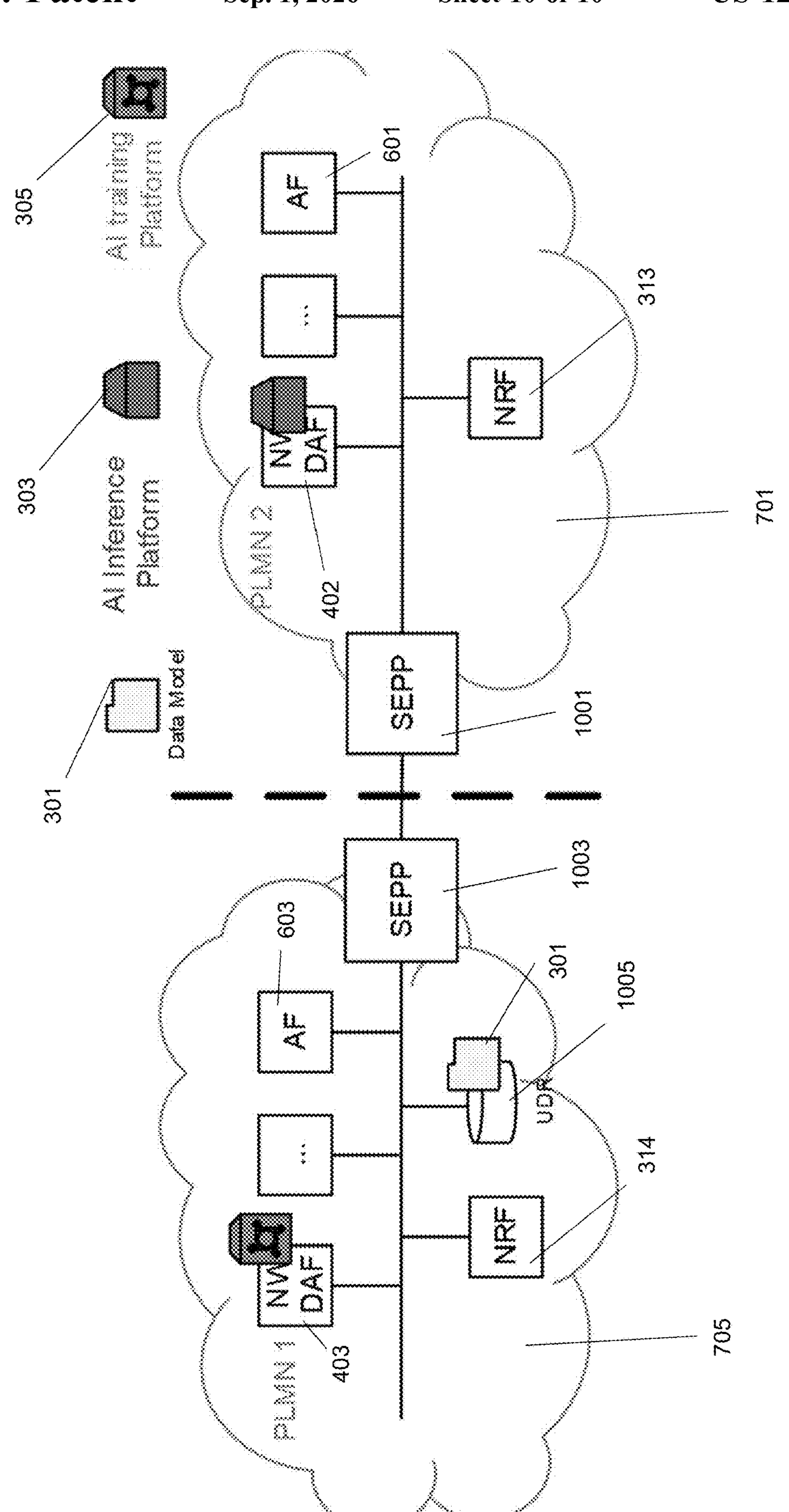
FIG. 10 shows a communication scenario according to a further example.

With reference to FIG. 10, the model is provided by PLMN 1 5GC NFs/NEs, e.g. NWDAF or UDR forming an example of a data storage. For example, the NWDAF 403 or data storage 1005 in PLMN 1 can provide the model to PLMN2 consumer NWDAF 402. If the service discover is already agreed between the operators, e.g., via NRF exchange, then the roaming architecture via SEPP 1003 can be used for secure signaling exchange between 5GC NFs of different PLMN.

A model can be configured directly in the data storage of 5GC (i.e., UDR) forming an example of a data storage configured by the OAM. In this case, UDR 1005 can be enhanced to provide the information of available model to the consumer NFs in 5GC as following. Data keys are used to search the data base of UDR to find the required storage data. To search for an ML Model, the data key would be the analytics ID, e.g. as specified in TS23.288, and the Data Sub keys would be Model type, Features sets, event IDs, area of interests, UE types, application ID, NSSAI, model information such as model ID, model time, model version etc.

The model time indicates, in an example, the time when the model is trained and/or when the model expires. The model time can be implemented in the form of a timestamp.

A model can be provided by a data storage as summarized in the following table. The Exposure data can be stored in an UDR, as e.g. specified in TS23.502.

TABLE IV

| Category | Information | Description | Data key | Data Sub key |
|---|---|---|---|---|
| Analytics information | ML Model | model used for analytics generation | Analytics ID | Model type, Feature sets/event IDs, TAI(s), UE types, application ID, NSSAI, additional model info, etc. |

In some embodiments, a model can be provided by an NE by combining the results from other NEs.

In an example, the model can also be provided by a Network Entity which obtains a model or model parameters from other network entities (e.g., federate server instead of a model training platform) to NWDAF. In this case, one more step can be useful, where the model provider may obtain the ML Model/model parameters from another NE such as the federate client, data storage or OAM configuration. It may further process the obtained model and model parameters, then provide the combined model to the consumer network functions.

The registration and discovery of model provided by other NEs may follow exactly what is described above, or may use an existing communication interfaces, e.g., the federate server/client communication mechanism as specified by SoA. The model provider may have some local information on the combined model (e.g., via OAM configuration or historical model processing).

Thereby, the model provider is informed what types of the combined model could be provided to the consumer NFs in 5GC. It registers the combined model to 5GC as described above. Then the 5GC NFs may discover and consume the model provided by the model provider.

In an example, the approach described herein is based on a signaling between NWDAF and other NFs on the model inquiry and model retrieval. In an example, there is no raw data sent in order to obtain the model.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

The invention claimed is:

1. A method for determining at least one model parameter of a model for digitally analyzing input data depending on the at least one model parameter of the model, the method comprising:

receiving, by a network entity of a public mobile land mobile network (PLMN) implementing a 5G core (5GC), a model request from a network data analytics function (NWDAF), wherein the model request is provided with area of interest information and/or Network Slice Selection Assistance Information (NSSAI), and wherein the network entity implements a machine learning (ML) model training platform which supports joint training of data sets from different parties without disclosure of the data sets between the different parties, and wherein the NWDAF implements an ML model inference platform; and in response to the model request, sending, by the network entity, a model parameter or a model towards the NWDAF.

2. The method of claim 1, further comprising:

registering a respective model at a network function (NF) repository function (NRF) of the PLMN based on a respective registration signal comprising registration information for the respective model.

3. The method of claim 2, wherein the registration information comprises at least one of the following: information on a model type, a data analytics identification, a set of features or event identifications (IDs) of the model, or at least one model parameter of the model.

4. The method of claim 1, wherein the model request is received with at least one of the following information:

a model type, a machine-leaning training algorithm, an analytics identification (ID), feature sets, an input data type particular event ID, an application ID, a model ID, or a model time.

5. The method of claim 1, further comprising:

executing and/or providing a machine-learning model training algorithm from a set of machine-learning model training algorithms available at the network entity.

6. The method of claim 1, wherein the area of interest information comprises one or more tracking area IDs (TAIs).

7. The method of claim 1, further comprising:

obtaining, by the network entity, at least one model parameter, wherein obtaining the at least one model parameter comprises at least one of the following:

executing a machine-learning model training algorithm to train the model with input data in order to determine the at least one model parameter;

searching a local database for an existing model; or requesting the at least one model parameter from a further network entity.

8. A method for determining at least one model parameter of a model for digitally analyzing input data depending on the at least one model parameter of the model, the method comprising:

receiving, by a network entity of a public mobile land mobile network (PLMN) implementing a 5G core (5GC), a model request from a network data analytics function (NWDAF), wherein the model request is provided with area of interest information and/or Network Slice Selection Assistance Information (NSSAI), and wherein the network entity implements an artificial intelligence (AI) model training platform which supports joint training of data sets from different parties without disclosure of the data sets between the different parties, and wherein the NWDAF implements an AI model inference platform; and in response to the model request, sending, by the network entity, a model parameter or a model towards the NWDAF.

9. The method of claim 8, further comprising:

registering a respective model at a network function (NF) repository function (NRF) of the PLMN based on a respective registration signal comprising registration information for the respective model.

10. The method of claim 9, wherein the registration information comprises at least one of the following: information on a model type, a data analytics identification, a set of features or event identifications (IDs) of the model, or at least one model parameter of the model.

11. The method of claim 8, wherein the model request is received with at least one of the following information:

a model type, a machine-leaning training algorithm, an analytics identification (ID), feature sets, an input data type particular event ID, an application ID, a model ID, or a model time.

12. The method of claim 8, further comprising:

executing and/or providing a machine-learning model training algorithm from a set of machine-learning model training algorithms available at the network entity.

13. The method of claim 8, wherein the area of interest information comprises one or more tracking area IDs (TAIs).

14. The method of claim 8, further comprising:

obtaining, by the network entity, at least one model parameter, wherein obtaining the at least one model parameter comprises at least one of the following:

executing a machine-learning model training algorithm to train the model with input data in order to determine the at least one model parameter;

searching a local database for an existing model; or requesting the at least one model parameter from a further network entity.

15. A non-transitory computer-readable storage medium having processor-executable instructions stored thereon for determining at least one model parameter of a model for digitally analyzing input data depending on the at least one model parameter of the model, wherein the processor-executable instructions, when executed, facilitate performance of the following:

receiving, by a network entity of a public mobile land mobile network (PLMN) implementing a 5G core (5GC), a model request from a network data analytics function (NWDAF), wherein the model request is provided with area of interest information and/or Network Slice Selection Assistance Information (NSSAI), and wherein the network entity implements an artificial intelligence (AI) model training platform which supports joint training of data sets from different parties without disclosure of the data sets between the different parties, and wherein the NWDAF implements an AI model inference platform; and in response to the model request, sending, by the network entity, a model parameter or a model towards the NWDAF.

16. The non-transitory computer-readable storage medium of claim 15, wherein the processor-executable instructions, when executed, further facilitate performance of the following:

registering a respective model at a network function (NF) repository function (NRF) of the PLMN based on a respective registration signal comprising registration information for the respective model.

17. The non-transitory computer-readable storage medium of claim 16, wherein the registration information comprises at least one of the following: information on a model type, a data analytics identification, a set of features or event identifications (IDs) of the model, or at least one model parameter of the model.

18. The non-transitory computer-readable storage medium of claim 15, wherein the model request is received with at least one of the following information:

a model type, a machine-leaning training algorithm, an analytics identification (ID), feature sets, an input data type particular event ID, an application ID, a model ID, or a model time.

19. The non-transitory computer-readable storage medium of claim 15, wherein the processor-executable instructions, when executed, further facilitate performance of the following:

executing and/or providing a machine-learning model training algorithm from a set of machine-learning model training algorithms available at the network entity.

20. The non-transitory computer-readable storage medium of claim 15, wherein the area of interest information comprises one or more tracking area IDs (TAIs).

* * * * *